United States Patent
Hsu et al.

(10) Patent No.: US 10,516,810 B2
(45) Date of Patent: *Dec. 24, 2019

(54) METHOD OF GAMUT MAPPING AND RELATED IMAGE CONVERSION SYSTEM

(71) Applicant: NOVATEK Microelectronics Corp., Hsin-Chu (TW)

(72) Inventors: Chia-Jung Hsu, Changhua County (TW); Wan-Ching Tsai, Taipei (TW); Chao-Wei Ho, Hsinchu County (TW); Chih-Chia Kuo, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,206

(22) Filed: May 30, 2018

(65) Prior Publication Data
US 2018/0278808 A1    Sep. 27, 2018

Related U.S. Application Data

(63) Continuation-in-part of application No. 15/063,462, filed on Mar. 7, 2016, now Pat. No. 10,019,785.

(51) Int. Cl.
*H04N 1/60* (2006.01)
*H04N 9/64* (2006.01)
*H04N 1/64* (2006.01)
*G06T 5/00* (2006.01)
*H04N 19/12* (2014.01)
(Continued)

(52) U.S. Cl.
CPC .......... *H04N 1/6061* (2013.01); *G06T 5/007* (2013.01); *G06T 5/009* (2013.01); *G06T 5/40* (2013.01); *H04N 1/64* (2013.01); *H04N 5/235* (2013.01); *H04N 9/64* (2013.01); *H04N 19/12* (2014.11); *H04N 19/186* (2014.11); *H04N 19/46* (2014.11); *G06T 2207/10024* (2013.01); *G06T 2207/20208* (2013.01); *H04N 19/30* (2014.11)

(58) Field of Classification Search
None
See application file for complete search history.

(56) References Cited

U.S. PATENT DOCUMENTS

2007/0091337 A1    4/2007  Morovic
2007/0269132 A1    11/2007 Duan
(Continued)

OTHER PUBLICATIONS

Huo, "A LDR Image Expansion Method for Displaying on HDR Screen", ICCP 2013.*

(Continued)

*Primary Examiner* — Yingchun He
(74) *Attorney, Agent, or Firm* — Winston Hsu

(57) ABSTRACT

A method of performing gamut mapping on an input image for an image output device includes receiving the input image to analyze a color distribution of the input image; determining a protect range corresponding to a first percentage of color codes of the input image and a compression range corresponding to a second percentage of the color codes of the input image based on the color distribution of the input image; and moving at least one of the color codes of the input image outside the protect range of the color codes to the compression range by a compression algorithm to perform gamut mapping on the input image.

7 Claims, 6 Drawing Sheets

(51) Int. Cl.
*H04N 19/186* (2014.01)
*H04N 19/46* (2014.01)
*G06T 5/40* (2006.01)
*H04N 5/235* (2006.01)
*H04N 19/30* (2014.01)

(56) References Cited

U.S. PATENT DOCUMENTS

| | | |
|---|---|---|
| 2010/0277492 A1* | 11/2010 | Frederick ............ G09G 3/2003 345/589 |
| 2011/0292246 A1 | 12/2011 | Brunner |
| 2013/0050245 A1* | 2/2013 | Longhurst ............... H04N 9/67 345/590 |
| 2013/0114000 A1 | 5/2013 | Atkins |
| 2013/0235072 A1 | 9/2013 | Longhurst |
| 2014/0078165 A1 | 3/2014 | Messmer |
| 2015/0103091 A1* | 4/2015 | Messmer ............ H04N 1/6058 345/590 |
| 2015/0256719 A1 | 9/2015 | Bishop |
| 2016/0191158 A1 | 6/2016 | Aoyama |
| 2016/0205372 A1* | 7/2016 | Liu ........................ H04N 5/20 |
| 2017/0161882 A1 | 6/2017 | Mantiuk |

OTHER PUBLICATIONS

Braun, "A Paradigm for color gamut mapping of pictorial images", Thesis, Oct. 1, 1999 (Year: 1999).*

* cited by examiner

METHOD OF GAMUT MAPPING AND RELATED IMAGE CONVERSION SYSTEM

CROSS REFERENCE TO RELATED APPLICATIONS

This application is a continuation-in-part application of U.S. application Ser. No. 15/063,462, filed on Mar. 7, 2016, the contents of which are incorporated herein by reference.

BACKGROUND OF THE INVENTION

1. Field of the Invention

The present invention relates to a method of performing gamut mapping, and more particularly, to a method of performing gamut mapping based on color distribution of the input image.

2. Description of the Prior Art

High dynamic range (HDR) is specified and designed for capturing, processing, and reproducing scene imagery, with increased shadow and highlight detail beyond current standard dynamic range (SDR) or low dynamic range (LDR) video and cinema systems capabilities.

However, a standard television set or display device features SDR or LDR, and may have a lower brightness level and a lower gamut range than that of HDR feature, so the standard television set ultimately removes some finer color and brightness details and contrasts from the HDR image.

Recently, HDR related standards being developed though HDR images/videos are not popular. Thus, there are few television sets supporting HDR and these television sets do not provide an entire solution in reproduction or approximation of HDR effect. For example, conventional color gamut mapping for HDR images is a static algorithm without considering gamut range differences between input videos and the television set, which leads to color-clipping (e.g., color outside SDR gamut range is clipped by the static algorithm) and hue-shift.

Therefore, there is a need to improve the prior art.

SUMMARY OF THE INVENTION

It is therefore an objective of the present invention to provide a method of performing gamut mapping based on color distribution of the input image.

An embodiment of the present invention discloses a method of performing gamut mapping on an input image for an image output device. The method comprises receiving the input image to analyze a color distribution of the input image; determining a protect range corresponding to a first percentage of color codes of the input image and a compression range corresponding to a second percentage of the color codes of the input image based on the color distribution of the input image; and moving at least one of the color codes of the input image outside the protect range of the color codes to the compression range by a compression algorithm to perform gamut mapping on the input image.

Another embodiment of the present invention discloses a method of performing gamut mapping on an input image for an image output device. The method comprises receiving the input image to analyze a color distribution of the input image; determining a protect range corresponding to a percentage of color codes of the input image and a maximum expansion range corresponding to a number of expanded pixels of the input image based on the color distribution of the input image; and increasing at least one of the color codes of the input image outside the protect range of the color codes to be within the maximum expansion range by an expansion algorithm to perform gamut mapping on the input image.

Another embodiment of the present invention discloses an image conversion system, which comprises a scene detector and a gamut mapping unit. The scene detector is configured for receiving an input image to analyze a color distribution of the input image. The gamut mapping unit, coupled to the scene detector, is configured for performing gamut mapping on the input image to generate an output image by a compression algorithm or an expansion algorithm based on the color distribution of the input image and a color gamut of an image output device receiving the output image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
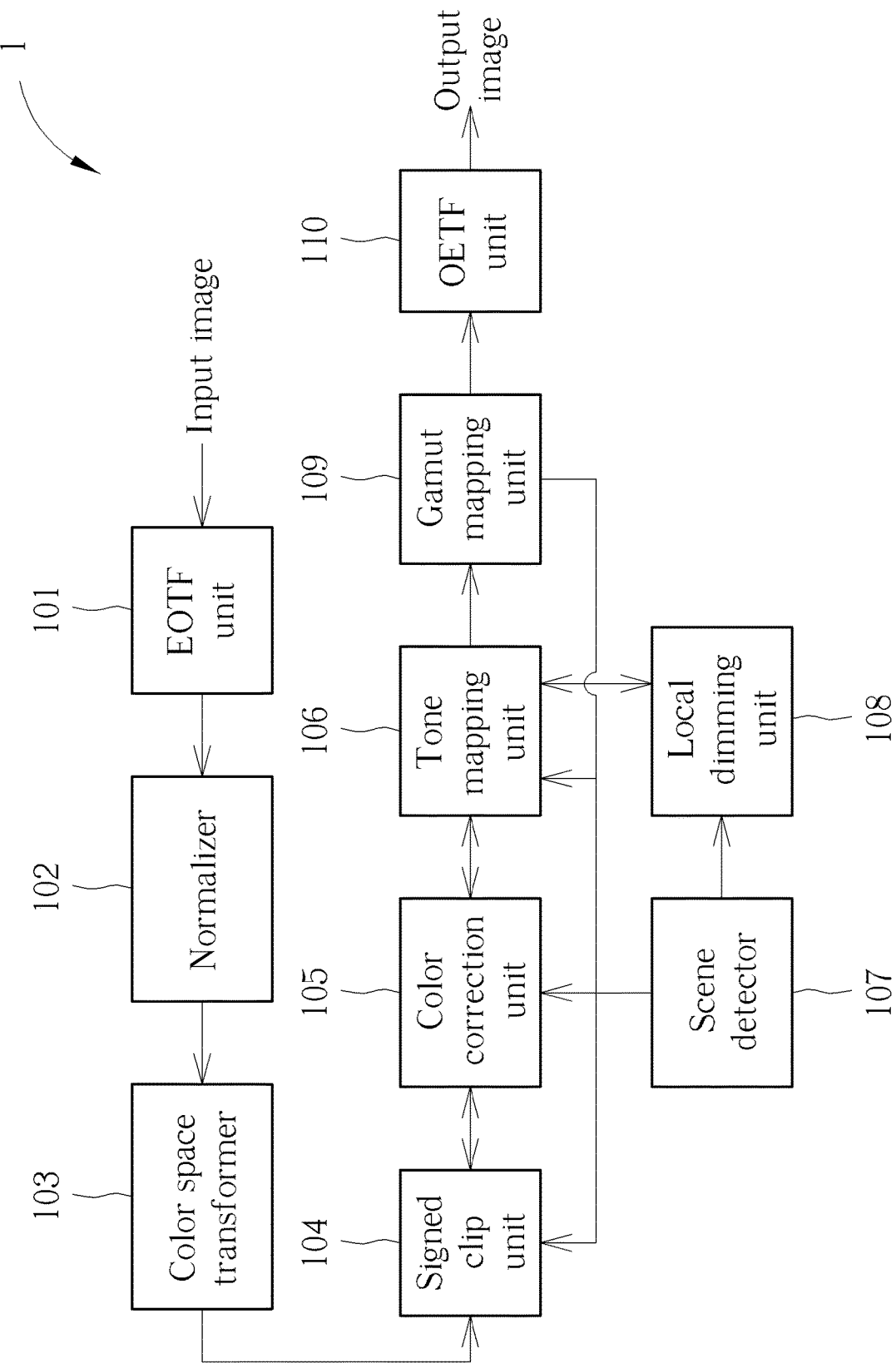
FIG. 1 is a functional block diagram of an image conversion system according to an embodiment of the present invention.

FIG. 1 is a functional block diagram of an image conversion system 1 according to an embodiment of the present invention. The image conversion system 1 is used for converting an input image into an output image, and includes an electro-optical transfer function (EOTF) unit 101, a normalizer 102, a color space transformer 103, a signed clip unit 104, a color correction unit 105, a tone mapping unit 106, a scene detector 107, a local dimming unit 108, a gamut mapping unit 109, and an optical-electro transfer function (OETF) unit 110.

The scene detector 107 is coupled to the signed clip unit 104, the color correction unit 105, the tone mapping unit 106, the local dimming unit 108 and the gamut mapping unit 109, for detecting and providing the scene information (e.g., color information) to at least one of the signed clip unit 104, the color correction unit 105, the tone mapping unit 106, the local dimming unit 108 and the gamut mapping unit 109.

Figure 2:
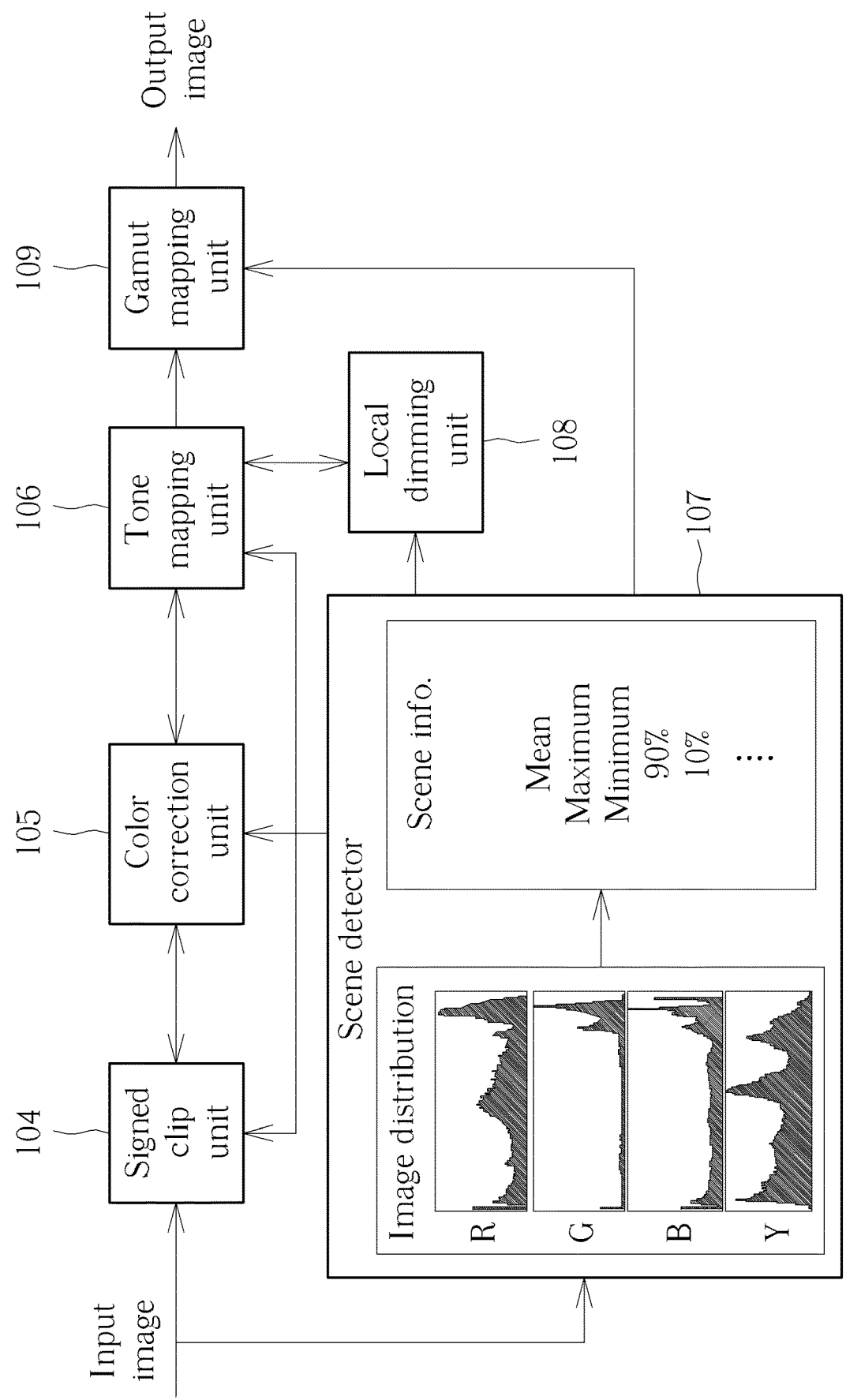
FIG. 2 illustrates interactions between the scene detector, the signed clip unit, the color correction unit, the tone mapping unit, the local dimming unit and the gamut mapping unit according to an embodiment of the present invention.

Detailed operations of the scene detector 107 can be obtained by referring to FIG. 2, which illustrates interactions between the scene detector 107, the signed clip unit 104, the color correction unit 105, the tone mapping unit 106, the local dimming unit 108 and the gamut mapping unit 109 according to embodiments of the present invention.

The scene detector 107 receives the input image and the metadata to analyze the image distribution of the input image to generate the scene information as dynamic metadata for dynamic adjustments from scene to scene. The image distribution includes color and luminance distributions including histograms of the R, G, B and Y channels of the input image. The scene detector 107 further receives the display capability of the television set, the ambient light, the user preference and any programmable features of the television set, at least one of which is considered in generating the scene information. The scene information includes mean, maximum and minimum, a portion (e.g., 90 percentage and 10 percentage) of pixel counts in the R, G, B and Y channels, and any possible statistic parameters of the input image.

The metadata of the input image is content-dependent and static, and can be applied in image distribution, in a source device of the input image, in the image output device, or not at all, depending on the needs and the display capabilities of the source device and the image output device. As the content characteristics and image distributions change from scene to scene, the scene detector 107 controls algorithms for image processing based on the metadata together with the dynamic metadata for dynamic adjustments. In other words, conventionally, signed clip, color correction, tone mapping, local dimming, and gamut mapping are static image processing algorithms without considering differences between scene and scene, neither the display range differences between the display device and the input image, which leads to image distortion and bad image quality.

To solve this issue, the scene detector 107 provides the scene information to at least one of the signed clip unit 104, the color correction unit 105, the tone mapping unit 106, the local dimming unit 108 and the gamut mapping unit 109, for dynamic image processing. The scene information needs fault tolerance for compatibility in various image processing standards and different display configurations. Therefore, with the scene information or the dynamic metadata, image processing algorithms can be adaptively and dynamically adjusted based on the scene information to improve image quality from scene to scene.

The gamut mapping unit 109 is coupled to the scene detector 107, for generating node values, a protect range, a compression range and/or a maximum expansion range according to an input gamut range of the input image, an output gamut range of an image output device such as a display device or a television set, to perform 3-dimensional (3D) color volume mapping. The node values refer to pixel's color codes corresponding to the R, G and B channels. The gamut mapping unit 109 calculates the node values, the gamut range, the protect range, the compression range and the maximum expansion range based on the metadata and the color distributions, at least one of which dynamically changes between various scenes.

In an embodiment, the input image is a high dynamic range (HDR) image, which is converted into a standard dynamic range (SDR) image or a low dynamic range (LDR) image to be displayed on a display device such as a television supporting SDR or LDR videos. The scene detector 107 receives the input image to analyze the color distribution of the input image, such as the distributions in the histograms of the R, G and B channels. The gamut mapping unit 109 then determines a protect range and a compression range based on the color distribution of the input image, where the protect range corresponds to a specific percentage of color codes of the input image and the compression range corresponds to another specific percentage of color codes of the input image. The gamut mapping unit 109 then moves or maps the color codes of the input image outside the protect range to the compression range by a compression algorithm, while the colors inside the protect range are completely preserved.

Figure 3:
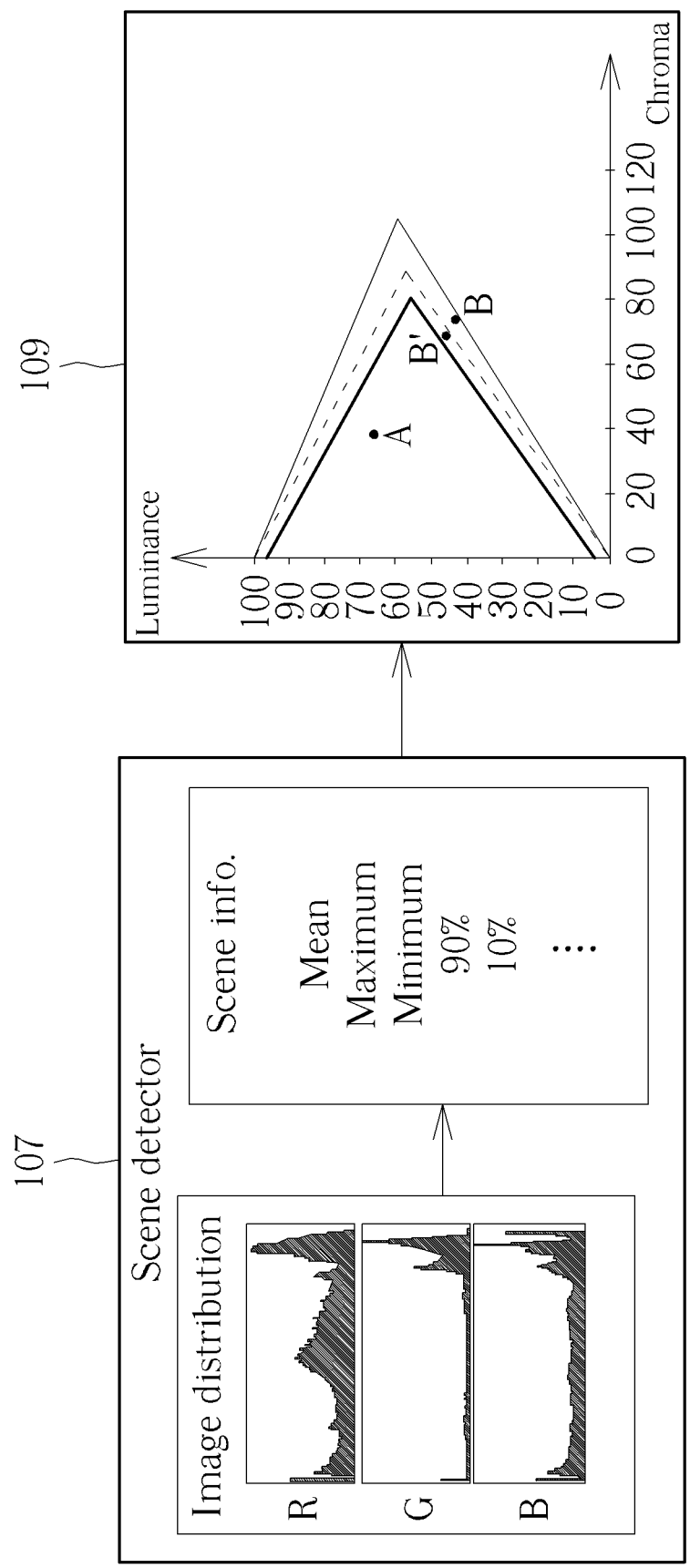
FIG. 3 illustrates operations of gamut mapping performed with color compression according to an embodiment of the present invention.

FIG. 3 illustrates operations of gamut mapping performed with color compression according to an embodiment of the present invention. For example, assume that the input HDR image is encoded based on ITU-R Recommendation BT. 2020 (Rec. 2020 or BT. 2020) to be displayed by the television set supporting Rec. 709. In FIG. 3, a full code range of Rec. 709 is enclosed by a dashed line, 0-90 percentage of the code range of Rec. 709 is enclosed by a thick solid line, and a full code range of BT. 2020 is enclosed by a thin solid line. In the embodiments of the present invention, the gamut mapping unit 109 may achieve gamut mapping between Rec. 709, BT. 2020, Digital Cinema Initiatives (DCI) P3, and any possible color gamut.

Based on the color distribution of the input image, the gamut mapping unit 109 determines that the protect range is set to be 0-90 percentage of the code range of Rec. 709, and the compression range is set to be 91-100 percentage of the code range of Rec. 709. A node A whose color code is inside 0-90 percentage of the code range of Rec. 709 (i.e., the protect range) will be kept in the same position after the gamut mapping; in other words, the color of the node A is completely preserved. Another node B whose color code is outside the full code range of Rec. 709 will be moved in the compression range (i.e., 91-100 percentage of the code range of Rec. 709) through the gamut mapping, to become a node B'; in other words, the color or node B is adjusted through the gamut mapping. In one embodiment, the gamut mapping for the node B or any nodes whose color code is outside the full range of Rec. 709 is performed based on non-linear compression algorithm. By this way, contrast of the node B or any nodes whose color code is outside the full range of Rec. 709 can be retained. As a result, colors inside the display gamut range can be represented faithfully by setting the protect range, and contrast of colors outside the display gamut range can be retained by setting the compression range for non-linear compression. Afterwards, the gamut mapping unit 109 performs post-processing for fine-tuning to maintain gray consistency of the output image. Therefore, the output image after the gamut mapping can approximate to HDR effect within a limited gamut range.

In detail, the protect range may be determined with several statistical values based on the color distribution of the input image. In other words, the gamut mapping unit 109 may obtain the statistical values according to the color distribution of the input image and then determine the protect rage according to the statistical values. These statistical values may include at least one of a middle value, a high value and a low value of the color codes. The middle value may be the mean value of the color distribution or the median value (i.e., 50 percent) of the color distribution. The high value may be a maximum value except an ignore range of code values, and may be configured as a value between 100-95 percentage of the color distribution. The ignore range may include outlier color codes that may wrongly influence the calculation of these statistical values. Preferably, the outlier values should be ignored, so that the determined protect range may faithfully reflect the color distribution obtained from the scene detector 107. For example, the ignore range may be configured to maximum 1 percentage of the color distribution, so that the high value is configured as the code value at 99 percentage of the color distribution. Similarly, the low value may be a minimum value except an ignore range, and may be configured as a value between 0-5 percentage of the color distribution.

In an embodiment, the protect range may be determined by the following equation:

$$\alpha_1 \times \left(\frac{LoValue}{MidValue}\right) + \beta_1 \leq PR \leq \alpha_2 \times \left(\frac{MidValue}{HiValue}\right) + \beta_2 \quad (1)$$

wherein PR stands for the protect range, LoValue stands for the low value, MidValue stands for the middle value, HiValue stands for the high value, and $\alpha_1$, $\alpha_2$, $\beta_1$ and $\beta_2$ are parameters obtained based on the low value, the middle value and the high value. Equation (1) defines the upper bound and the lower bound of the protect range. The parameters $\alpha_1$ and $\alpha_2$ are considered as gains and the parameters $\beta_1$ and $\beta_2$ are considered as offsets for determining the lower bound and upper bound of the protect range based on the statistical values of the color distribution.

As for the upper bound, the parameters $\alpha_2$ and $\beta_2$ may be obtained as follows:

$$\beta_2 = \frac{HiValue}{MaxValue} \times (50 + user\beta)$$

$$\alpha_2 = \frac{MidValue - \beta_2}{HiValue} \times (user\alpha)$$

wherein MaxValue stands for the maximum value of the color distribution, and the parameters $user\alpha$ and $user\beta$ are user defined values for tuning the parameters $\alpha_2$ and $\beta_2$. In this embodiment, the parameter $\beta_2$ is calculated based on the high value and the maximum value, and the parameter $\alpha_2$ is calculated based on the value of $\beta_2$. In order to obtain a better quality and improve the visual experience for the output image, the parameters $\alpha_2$ and $\beta_2$ may be obtained by tuning the user defined parameters $user\alpha$ and $user\beta$ based on user preference. In an embodiment, the values of the parameters $\alpha_2$ and $\beta_2$ may be obtained from a lookup table determined based on the statistical values of the color distribution such as the high value and the middle value, where the lookup table includes user adjustment for improving the user experience.

As for the lower bound, the parameters $\alpha_1$ and $\beta_1$ may be obtained by a similar method, which is omitted herein for simplicity.

Please note that the non-linear compression algorithm may be realized in any manners. In an exemplary embodiment, the compression algorithm may follow an algorithm introduced by CIE's technical committee (CIE TC8-03) to combine methods of GCUSP and sigmoidal lightness mapping and cusp knee scaling. This algorithm may keep hue consistency and preserve colors as much as possible.

Figure 4:
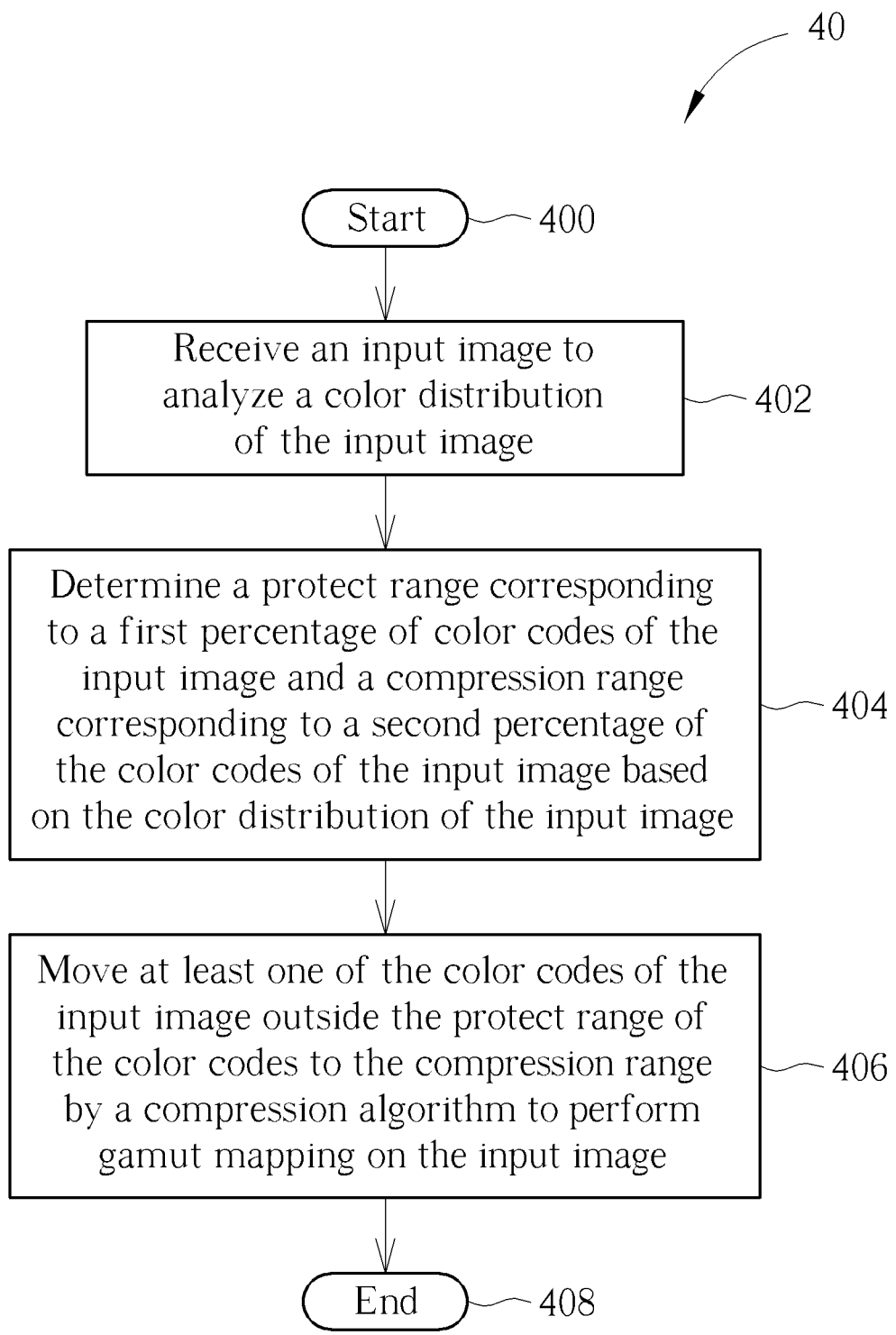
FIG. 4 is a gamut mapping process according to an embodiment of the present invention.

The abovementioned operation of the gamut mapping unit 109 with respect to color compression may be summarized into a gamut mapping process 40, as shown in FIG. 4. The gamut mapping process 40 includes the following steps:

Step 400: Start.

Step 402: Receive an input image to analyze a color distribution of the input image.

Step 404: Determine a protect range corresponding to a first percentage of color codes of the input image and a compression range corresponding to a second percentage of the color codes of the input image based on the color distribution of the input image.

Step 406: Move at least one of the color codes of the input image outside the protect range of the color codes to the compression range by a compression algorithm to perform gamut mapping on the input image.

Step 408: End.

In another embodiment, the input image is a SDR image or a LDR image, which is converted into a HDR image to be displayed on a display device such as a television supporting HDR videos. The television is capable of displaying a larger color gamut, and thus the gamut of the input image may be expanded to a higher level to efficiently utilize the display capability of the television. In this manner, the output image in the television becomes more vivid and colorful after gamut mapping.

However, if the color codes are expanded more severely, the image may become unreal and unnatural. Similarly, the gamut mapping unit 109 may set a protect range corresponding to a specific percentage of color codes of the input image, so that the colors within the protect range are completely preserved to be faithfully represented in the output image. The color codes outside the protect range are expanded based on the color gamut or the display capability of the display device. Further, the gamut mapping unit 109 may determine a maximum expansion range corresponding to the number of expanded pixels of the input image based on the color distribution of the input image and the color gamut of the display device, and then increase or expand the color codes of the input image outside the protect range to be within the maximum expansion range by an expansion algorithm.

In order to prevent the image becomes unnatural after gamut mapping, it is preferable to expand deep colors to be more vivid while preserving light colors. In such a situation, the protect range is determined to be corresponding to the color codes smaller than a specific percentage of the color distribution, while the color codes greater than the percentage are expanded or increased. The color codes are determined by the color distribution of the input image obtained from the scene detector 107, such as the distributions in the histograms of the R, G and B channels as mentioned above.

Figure 5:
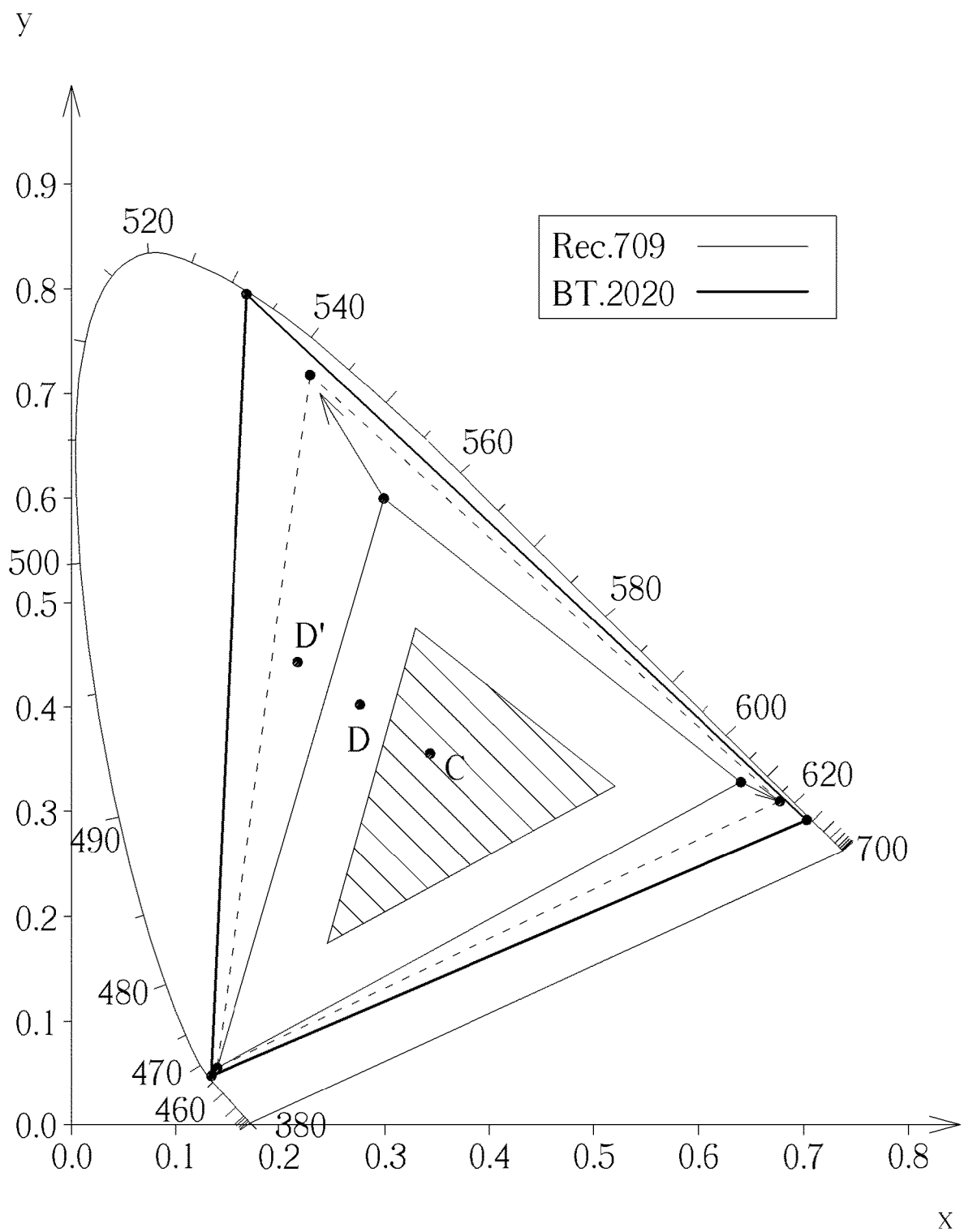
FIG. 5 illustrates operations of gamut mapping performed with color expansion according to an embodiment of the present invention.

FIG. 5 illustrates operations of gamut mapping performed with color expansion according to an embodiment of the present invention. Note that FIG. 5 is a CIE 1931 color space chromaticity diagram showing the input image to be expanded and the generated output image after expansion. For example, assume that the input image is encoded based on Rec. 709 (as a SDR image) to be displayed by the television set supporting BT. 2020 (as a HDR image). As shown in FIG. 5, a full code range of BT. 2020 is enclosed by a thick solid line, and a full code range of Rec. 709 is enclosed by a thin solid line. In order to allow the SDR image to be displayed in the television with higher color gamut, the gamut mapping unit 109 expands the color codes of the SDR image with an expansion ratio, to reach a level which is enclosed by a dashed line. The expansion ratio may be determined based on the color gamut or the display capability of the television, allowing the reached expansion range to be within the full code range of the HDR image supported by the television. Alternatively or additionally, the expansion ratio may be determined based on the statistical values of the color distribution of the input image.

Based on the color distribution of the input image, the gamut mapping unit 109 determines a protect range having color codes smaller than a specific percentage of the color distribution, as specified by the oblique line area shown in FIG. 5. In an embodiment, the gamut mapping unit 109 may determine that the color codes smaller than 60 percentage of the color distribution are in the protect range. In such a situation, the color codes smaller than 60 percentage of the color distribution in the input image are completely preserved to be faithfully represented in the output image (e.g., the node C), and the color codes greater than 60 percentage of the color distribution in the input image are expanded (e.g., from the node D to the node D'), allowing the deep colors to become more vivid. Since each scene may have different color distribution, the protect range may dynamically change with the color distribution obtained from the scene detector 107.

In an embodiment, the gamut mapping unit 109 may obtain the statistical values according to the color distribution of the input image and then determine the protect rage according to the statistical values. For example, the protect range may be determined by the following equation:

$$PR \leq \alpha_3 \times ExpandValue + \beta_3 \quad (2)$$

wherein PR stands for the protect range, ExpandValue stands for a specific percentage such as 60 percentage, and $\alpha_3$ and $\beta_3$ are user defined parameters for tuning the protect range.

In addition, the maximum expansion range of the color expansion operation may be calculated as follows:

$$ExpandMaxRange = (\alpha_4 \times MaxValue + \beta_4) \times \frac{ExpandPx}{AllPx} \quad (3)$$

wherein ExpandMaxRange stands for the maximum expansion range, MaxValue stands for the maximum value of expansion, ExpandPx stands for the number of expanded pixels in the input image, AllPx stands for the number of all pixels in the input image, and $\alpha_4$ and $\beta_4$ are user defined parameters for tuning the maximum expansion range.

Please note that the maximum expansion range is determined based on the number of expanded pixels in the input image. Suppose that the color codes greater than 60 percentage of the color distribution are expanded. If there are more pixels having color codes greater than 60 percentage, these color codes may be expanded more, to enrich the color; if there are fewer pixels having color codes greater than 60 percentage, the expansion level may be less, to prevent the side effect of contour or discontinuity due to excessive expansion in fewer pixels. For example, if the red-like color occupies the majority of the image frame, it is preferable to expand more red-like scope to show more colorful red while expanding fewer blue-like and green-like colors. Also note that the determination of the protect range and the maximum expansion range is also based on the user defined parameters $\alpha_3$, $\beta_3$, $\alpha_4$ and $\beta_4$, respectively. This means that the protect range and the maximum expansion range may be determined according to user preference to achieve a desired output image to be displayed.

Please note that the expansion algorithm may be realized in any manners. In an exemplary embodiment, the expansion algorithm may follow the paper Gamut Extension for Cinema. It is a perception-based algorithm to reduce visual distortions, keep natural in appearance and be faithful to the original material.

Figure 6:
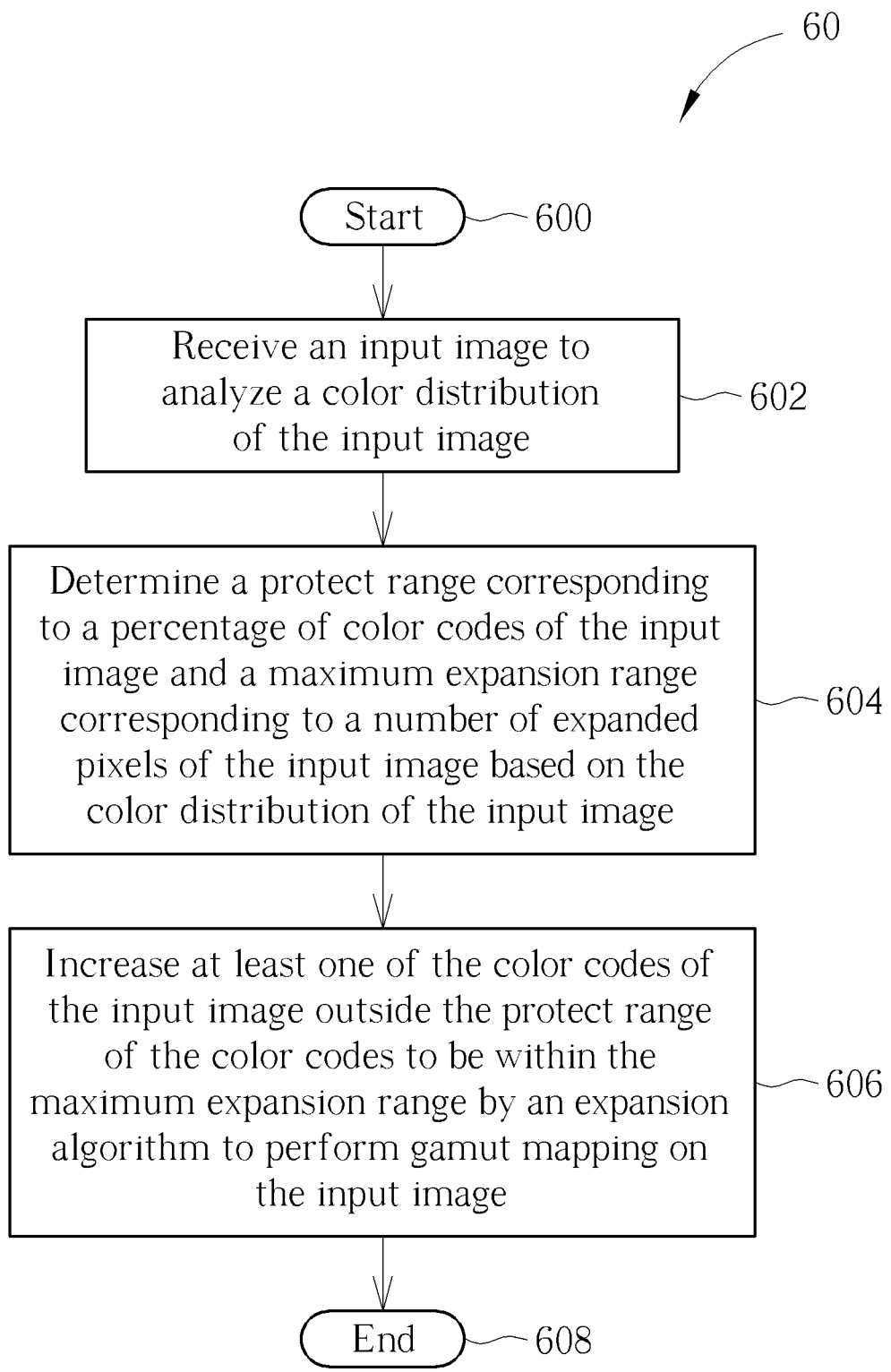
FIG. 6 is a gamut mapping process according to an embodiment of the present invention.

The abovementioned operation of the gamut mapping unit 109 with respect to color expansion may be summarized into a gamut mapping process 60, as shown in FIG. 6. The gamut mapping process 60 includes the following steps:

Step 600: Start.

Step 602: Receive an input image to analyze a color distribution of the input image.

Step 604: Determine a protect range corresponding to a percentage of color codes of the input image and a maximum expansion range corresponding to a number of expanded pixels of the input image based on the color distribution of the input image.

Step 606: Increase at least one of the color codes of the input image outside the protect range of the color codes to be within the maximum expansion range by an expansion algorithm to perform gamut mapping on the input image.

Step 608: End.

Please note that the present invention aims at providing a method of performing gamut mapping with color compression or expansion based on color distribution of the input image. Those skilled in the art may make modifications and alternations accordingly. For example, the image conversion system and the gamut mapping unit of the present invention are applicable to a display device such as a television, for generating an image adaptive to the color gamut of the display device, but not limited thereto. In an embodiment, the image conversion system and the gamut mapping unit of the present invention may be applied to any other image output device requiring color conversion or color remapping, such as a printer.

To sum up, the present invention provides a method of performing gamut mapping based on color distribution of the input image. The scene detector analyzes color distribution of the input image to generate the scene information as dynamic metadata for dynamic adjustment. The gamut mapping unit then performs gamut mapping based on the scene information. In an embodiment, a HDR image is converted into a SDR image or a LDR image, and the gamut mapping unit maps color codes in the HDR image into lower color codes for the SDR image or the LDR image by a compression algorithm. In an embodiment, a SDR image or a LDR image is converted into a HDR image, and the gamut mapping unit maps color codes in the SDR image or the LDR image into higher color codes for the HDR image by an expansion algorithm. Therefore, the gamut mapping operation may be dynamically adjusted based on the color distribution, which retains flexibility for dynamic adjustments to achieve a high performance in the output image from scene to scene.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing gamut mapping on an input image for an image output device, comprising:
   receiving the input image to analyze a color distribution of the input image;
   determining a protect range corresponding to a first percentage of color codes of the input image and a compression range corresponding to a second percentage of the color codes of the input image based on the color distribution of the input image; and
   moving at least one of the color codes of the input image outside the protect range of the color codes to the compression range by a compression algorithm to perform gamut mapping on the input image;
   wherein the step of determining the protect range corresponding to the first percentage of the color codes of the input image comprises:

determining that the protect range corresponds to the color codes less than a specific percentage of the color distribution.

2. The method of claim 1, wherein the compression algorithm is a non-linear compression algorithm.

3. The method of claim 1, wherein the step of determining the protect range corresponding to the first percentage of the color codes of the input image comprises:
obtaining a plurality of statistical values according to the color distribution of the input image; and
determining the protect range according to the plurality of statistical values.

4. The method of claim 3, wherein the plurality of statistical values comprise at least one of a middle value of the color codes, a high value of the color codes and a low value of the color codes.

5. The method of claim 1, wherein the image output device is a display device, and the input image is a high dynamic range image, which is converted into a standard dynamic range image or a low dynamic range image to be displayed on the display device after the gamut mapping.

6. A method of performing gamut mapping on an input image for an image output device, comprising:
receiving the input image to analyze a color distribution of the input image;
determining a protect range corresponding to a percentage of color codes of the input image and a maximum expansion range corresponding to a number of expanded pixels of the input image based on the color distribution of the input image; and
increasing at least one of the color codes of the input image outside the protect range of the color codes to be within the maximum expansion range by an expansion algorithm to perform gamut mapping on the input image;
wherein the step of determining the protect range corresponding to the percentage of the color codes of the input image comprises:
determining that the protect range corresponds to the color codes less than a specific percentage of the color distribution.

7. The method of claim 6, wherein the image output device is a display device, and the input image is a standard dynamic range image or a low dynamic range image, which is converted into a high dynamic range image to be displayed on the display device after the gamut mapping.

* * * * *